United States Patent [19]
Beckers

[11] 3,839,087
[45] Oct. 1, 1974

[54] PERCHLOROETHYLENE VAPOR DEGREASING PROCESS

[75] Inventor: Norman L. Beckers, Chardon, Ohio

[73] Assignee: Diamond Shamrock Corporation, Cleveland, Ohio

[22] Filed: Nov. 17, 1972

[21] Appl. No.: 307,648

[52] U.S. Cl.............. 134/31, 252/171, 252/392, 252/396, 260/652.5 R
[51] Int. Cl....... B08b 5/00, C23g 5/02, C07c 17/40
[58] Field of Search............. 134/31; 260/652.5 R; 252/388, 396, 171

[56] References Cited
UNITED STATES PATENTS

| | | | |
|---|---|---|---|
| 2,364,588 | 12/1944 | Morris et al. | 260/652.5 R |
| 2,371,645 | 3/1945 | Aitchison et al. | 134/31 |
| 2,721,883 | 10/1955 | Stevens | 260/652.5 R |
| 2,904,600 | 9/1959 | Copelin | 260/652.5 R |
| 3,031,410 | 4/1962 | Petering et al. | 260/652.5 R |
| 3,260,760 | 7/1966 | Domen et al. | 260/652.5 R |

FOREIGN PATENTS OR APPLICATIONS

| | | | |
|---|---|---|---|
| 418,230 | 10/1934 | Great Britain | 260/652.5 R |

*Primary Examiner*—Morris O. Wolk
*Assistant Examiner*—Arnold Turk
*Attorney, Agent, or Firm*—William A. Skinner

[57] ABSTRACT

A perchloroethylene vapor degreasing process wherein one of the following chemical components is added to the stabilizer system in perchloroethylene to improve its stability:
1. epibromohydrin
2. epibromohydrin and allyl glycidyl ether
3. epibromohydrin and N-ethyl morpholine
4. epibromohydrin, allyl glycidyl ether and N-ethyl morpholine
5. N-ethyl morpholine
6. N-ethyl morpholine and allyl glycidyl ether.

6 Claims, No Drawings

PERCHLOROETHYLENE VAPOR DEGREASING PROCESS

BACKGROUND OF THE INVENTION

Perchloroethylene vapor degreasing processes are widely used industrially. In these processes, the article being cleaned is suspended above the surface of a stabilized perchloroethylene composition which is being vaporized and the suspended article is cleaned by condensation of perchloroethylene vapors on its surface. A stabilized perchloroethylene composition must be used because perchloroethylene tends to be decomposed by oxygen, heat, light, metal salts and other contaminants present during its use and storage in vapor degreasing operations. Decomposition of perchloroethylene in the vapor degreasing process is undesirable in that not only are its desirable properties adversely affected but its useful life as a solvent is limited.

Decomposition of perchloroethylene in the vapor degreasing process can be minimized or prevented by the addition of small but effective quantities of chemical components to the perchloroethylene which act as stabilizers and prevent substantial decomposition from occurring during the vapor degreasing process. These components are often combinations of several different types of chemical compounds and the resulting combinations are known as stabilizer systems. For example, a combination of epichlorohydrin and N-methyl morpholine has been used to stabilize perchloroethylene against decomposition during the vapor degreasing process. Although this combination is effective in specific applications, the search for more effective perchloroethylene stabilizer systems for use in vapor degreasing processes continues.

STATEMENT OF THE INVENTION

An improved perchloroethylene degreasing process has been discovered. In this process one of the following chemical components is added to the stabilizer system used in perchloroethylene to improve stability of the solvent and to reduce the tendency of the solvent to decompose during use in the vapor degreasing process:

1. epibromohydrin
2. epibromohydrin and allyl glycidyl ether
3. epibromohydrin and N-ethyl morpholine
4. epibromohydrin, allyl glycidyl ether and N-ethyl morpholine
5. N-ethyl morpholine
6. N-ethyl morpholine and allyl glycidyl ether.

Perchloroethylene stabilized with a stabilizer system containing an effective amount of epibromohydrin of epibromohydrin and allyl glycidyl ether retains satisfactory acid acceptance after substantial amounts of perchloroethylene have been lost by evaporation during vapor phase degreasing process. Stabilization of perchloroethylene with a stabilizer system containing an effective amount of N-ethyl morpholine reduces any acidity that is formed in the stabilized solvent after loss of substantial amounts of perchloroethylene by evaporation during the vapor degreasing process. Epibromohydrin or epibromohydrin and allyl glycidyl ether may be used alone or in conjunction with N-ethyl morpholine in the perchloroethylene stabilizer system. Likewise N-ethyl morpholine may be used alone or in combination with epibromohydrin and allyl glycidyl ether or allyl glycidyl ether or epibromohydrin in the perchloroethylene stabilizer system.

DESCRIPTION OF THE PREFERRED EMBODIMENTS

The vapor degreasing process is carried out using a stabilized perchloroethylene composition containing one of the following chemical components:

1. epibromohydrin
2. epibromohydrin and allyl glycidyl ether
3. epibromohydrin and N-ethyl morpholine
4. epibromohydrin, allyl glycidyl ether and N-ethyl morpholine
5. N-ethyl morpholine
6. N-ethyl morpholine and allyl glycidyl ether The quantity of the chemical component added to the stabilizer system in the practice of this invention will vary depending on the nature and quantity of other stabilizers present in the stabilizer system used as well as other practical considerations. The quantity of the component used in the system is "an effective amount" or "a stabilizing amount." This quantity may be within the range of from about 0.001 to about 2 percent and preferably from about 0.005 to about 0.5 percent by weight based on the solvent. Even though higher concentrations of these components may not be harmful, higher concentrations increase costs and can seldom be justified.

Since perchloroethylene is very susceptible to decomposition and is easily decomposed by a variety of agents over a wide range of conditions, it may be desirable to use the above mentioned components in systems containing other stabilizers or co-stabilizers. The other stabilizers either provide different types of stabilization or enhance the stabilizing action of these components.

One class of stabilizers, which may be incorporated into perchloroethylene stabilizer systems containing one of the abovementioned components, are aliphatic and aromatic amines such as diethylamine, triethylamine, dipropylamine, diisopropylamine, diethanolamine, morpholine, N-methylmorpholine, pyridine and aniline. Other nitrogen-containing materials such as pyrroles, e.g., methylpyrrole and nitroalkanes, e.g., nitromethane and nitropropane may also be used.

Certain oxygen-containing organic compounds are also useful. Organic epoxides such as ethylene oxide, propylene oxide, butylene oxide, epichlorohydrin, glycidol, cyclohexene oxide and styrene oxide may be used. Certain cyclic ethers such as tetrahydropyran, dioxane, dioxolane, trioxane and tetrahydrofuran are useful.

Another useful class of stabilizers are aromatic compounds containing a phenol group such as phenol, butylphenol, thymol, catechol, isoeugenol and other organic phenols having low boiling points.

Also useful are a number of miscellaneous organic compounds such as esters, e.g., ethyl acetate; alcohols, e.g., amyl alcohol and methyl butynol, and ketones, e.g., methyl ethyl ketone.

The vapor degreasing process is carried out in an open steel tank having a heated solvent reservoir or sump at the bottom and a cooling zone near the top of the tank. Sufficient heat is introduced into the sump to boil the solvent and generate hot vapor. Because the hot vapor is heavier than air, it displaces the air and fills the tank up to the cooling zone. The hot vapor condenses when it reaches the cooling zone, thus maintaining a fixed vapor level and creating a thermal balance. A cool metal workpiece to be cleaned is lowered into the hot vapor where the relative coolness of the workpiece causes the solvent to condense on its surface. The condensate dissolves the soil and removes it from the surface by dripping back into the boiling solvent in the sump. When the workpiece reaches the temperature of the hot vapor, condensation and cleaning cease. Workpieces are dry when removed from the tank.

Perchloroethylene has numerous advantages as a solvent in the vapor degreasing process. Its high operating temperature provides complete drying of the work by vaporizing entrapped moisture. Perchloroethylene reduces staining of light-gage metals which reach vapor temperatures too rapidly in lower boiling solvents before sufficient condensation has occurred to perform satisfactory cleaning. Perchloroethylene condensate is retained on the workpiece for a longer period of time and provides a removal thorough remoaval of high-melting waxes from the workpiece.

One of the disadvantages of perchloroethylene is that appreciable quantities of the solvent and the stabilizers present in the solvent are lost by evaporation during its use in the vapor degreasing process. Disproportionate amounts of individual stabilizers present in the system are lost during evaporation so that the stabilizer system no longer provides satisfactory protection. The stability of perchloroethylene containing effective amounts of the above-mentioned components in the stabilizer system is not adversely affected even after considerable evaporation has occurred.

The process of this invention is useful in cleaning articles fabricated from aluminum, brass, copper, galvanized iron, nickel, steel and stainless steel, as indicated by absence of any deleterious effect when repeatedly exposed in the vapor zone of the degreaser.

For a fuller understanding of the nature and objects of this invention, reference may be made to the following examples. These examples are given merely to illustrate the invention and are not to be construed in a limiting sense. All quantities, proportions and percentages are by weight and all references to temperature are °C unless otherwise indicated.

EXAMPLE 1

Perchloroethylene samples containing the various stabilizer systems described below are prepared and evaluated in a "minidegreaser."

The minidegreaser simulates a commercial vapor phase degreaser. It is a cylindrical nickel pot 8 3/16 diameter ×12 inches high equipped with 3 ½ turns of ¼ inch stainless steel tubing positioned inside and 4 inches from the top of the pot which functions as a cooling coil. The outside wall of the pot is insulated with 1 ½ inches fiber glass and is heated on a hot plate inside a fume hood. At the beginning of the test, the pot is filled to a depth of 4 inches with the liquid perchloroethylene sample (3,400 ml) which allows for a 4 inch solvent vapor zone above the liquid solvent and a 4 inch air space above the solvent vapor zone. There are about 3 inches of freeboard in the air space above the cooling coil. Samples taken from the boiling liquid in the sump are referred to as "Boiling Sump Samples." The required amount of the liquid perchloroethylene sample is added to the pot and heated to boiling. A Boiling Sump Sample is taken before any evaporation occurs and after 25 percent evaporation and analyzed to determine how much of the acid acceptor (epoxide) has been lost during evaporation of 25 percent of the solvent. Results of these analyses are reported in Table I under the heading Acid Acceptance as percent NaOH, which can be determined by adding a known amount of anhydrous alcoholic HCl to the sample, back titrating to a bromphenol blue end point with standardized dilute caustic soda and calculating as % NaOH.

Perchloroethylene samples are stabilized with the stabilizer systems shown in Table I by using 75 ppm of N-methyl morpholine, 5 ppm of p-tertiary amylphenol and the indicated quantity of epoxide or epoxides. Each sample is evaluated in the minidegreaser by boiling until 25 percent of the solvent has evaporated and then determining the Acid Acceptance as % NaOH.

Results of the tests in the minidegreaser with these samples are given in Table I. These results show that Sample 1, which contains epichlorohydrin as an acid acceptor and represents the prior art, loses about 84 percent of its acid acceptance after 25 percent of the smaple is evaporated. Sample 2, which contains an equimolar quantity of epibromohydrin and is within the scope of this invention, loses about 25 percent of its acid acceptance after 25 percent of the sample is evaporated. Sample 3, which contains an equimolar quantity of a mixture of epibromohydrin and allyl glycidyl ether and is within the scope of this invention loses about 37 percent of its acid acceptance. Sample 4, which contains an equimolar quantity of a mixture of epichlorohydrin and allyl glycidyl ether and represents the prior art, loses about 48 percent of its acid acceptance.

EXAMPLE 2

Two perchloroethylene samples are prepared and evaluated following the minidegreaser test procedure described in Example 1 with the exception that 26.5 percent of Sample 5 and 28.4 percent of Sample 6 are evaporated.

Both samples are also evaluated in a "48 hour stability test." This test involves charging 100 ml of the sample and 0.2 ml of distilled water into a flask equipped with a Soxhlet extractor and condenser. Three 0.003 gauge steel strips (2.0 × 7.5 cm) are placed at three locations in the apparatus: the first strip is placed in the solvent in the flask; the second strip placed in the Soxhlet extractor and the third strip inserted in the lower end of the condenser. A 6 watt fluorescent (black light) bulb is placed one inch from the vapor tube on each Soxhlet extractor. Heat is then applied at a rate sufficient to cause each Soxhlet extractor to siphon every 8 to 10 minutes. Refluxing is continued for 48 hours. At the end of 48 hours, the samples are allowed to cool. The three strips are then removed, cleaned to remove corrosion and weighed to determine amount of corrosion caused by exposure of steel to the solvent sample. The amount of corrosion is expressed as weight loss and is shown in Table II as "mg loss." This value is a measure of the corrosivity of the stabilized solvent as well as its decomposition products. Acidity of each solvent sample after the test is determined by shaking a volume of the perchloroethylene sample with an equal volume of neutral distilled water, separating the resulting aqueous phase and titrating to a bromthymol blue end point with standarized dilute caustic soda, and is reported in Table II as "Acid as % HCl."

Compositions of Samples 5 and 6 are shown in Table II. It will be noted that Sample 5 is based on the prior art and that Sample 6 is within the scope of this invention. The results in the Table II show that Sample 5 loses 92 percent of its acid acceptance after 26.5 percent of the solvent has been evaporated in the minidegreaser test while Sample 6 loses about 28 percent of its acid acceptance after 28.4 percent of the solvent has been evaporated. Results in Table II also show that Sample 6 is 2.5 times less corrosive than Sample 5 and produces 96 percent less HCl in the 48 hour stability test.

EXAMPLE 3

Perchloroethylene Sample 7 containing the stabilizer system shown in Table III is prepared. This sample differs from the prior art in that it contains epibromohydrin, allyl glycidyl ether and N-ethyl morpholine in the stabilizer system. Evaluation of the sample using the minidegreaser test procedure described in Example 1 shows that the sample loses 58 percent of its acid acceptance after 25.9 percent of the sample has been evaporated.

This sample is also evaluated in a "72 hour stability test" which differs from the "48 hour stability test" described in Example 2 only in that the test requires 72 instead of 48 hours. A 63 mg metal loss occurs in 72 hour stability test and the solvent sample has an alkalinity of 0.0024 percent as NaOH after the test. Addition of N-ethyl morpholine elminates the acidity obtained after evaporation test and after the stability test. About 15 ppm of N-methyl morpholine, 67 ppm of p-tertiary amylphenol and 119 ppm of N-ethyl morpholine remain in the sample after 25.9 percent of the sample has been evaporated.

EXAMPLE 4

Perchloroethylene samples containing the quantities of epoxide (epichlorohydrin) shown in Table IV are prepared and evaluated in the minidegreaser and in a commercial vapor degreaser at no work load (idling). The minidegreaser is described in Example 1 above and the commerical degreaser is an open top vaporspray type which is 28 inches wide, 52 inches long and 56 inches high from bottom of the boiling sump to the top of the freeboard.

Results in Table IV show that both degreasers give comparable results and that substantial quantities of the epoxide (epichlorohydrin) are lost by evaporation. Further, acid acceptance decreases from 53 to 77 percent during evaporation.

Perchloroethylene samples containing the quantities of epoxides (epibromohydrin and mixtures of epibromohydrin and epichlorohydrin) shown in Table V are prepared and evaluated in the minidegreaser and commercial degreaser at no work load (idling). Results of these tests are shown in Table V and indicate the benefits obtained with epibromohydrin or mixtures containing epibromohydrin, namely that percent decrease in total epoxide, thus decrease in acid acceptance, is less than when only epichlorohydrin is present.

EXAMPLE 5

Perchloroethylene samples containing the quantities of expoxide and epoxide mixtures shown in Table VI are prepared and evaluated in the commercial degreaser described in Example 4. These samples are tested for 41 to 46 hours using 515 to 990 pounds per hour steel and glavanized iron work loads in galvanized iron baskets. Water cooled coupons of aluminum, brass, copper, galvanized iron, steel and stainless steel are suspended half into the vapor zone. No deleterious effect on any of the coupons is noted.

Results of the tests with the perchloroethylene samples shown in Table VI reveal lower per cent decreases of total epoxides and N-ethyl morpholine, even at higher work loads and after higher solvent evaporation, than with only epichlorohydrin and N-methyl morpholine present, as indicated by acid acceptance and alkalinity.

Perchloroethylene samples containing the quantities of epoxide and epoxide mixture shown in Table VII are prepared and evaluated in the commercial degreaser described in Example 4.

Sample 18, which contains epichlorohydrin and N-methyl morpholine in the stabilizer system and represents the prior art, is evaluated at no work load, with no oil contamination during period of test. While solvent loss is only 12.1 percent, the decrease of epichlorohydrin is 68.1 percent and decrease of N-methyl morpholine is 45.2 percent.

Sample 19 which contains epichlorohydrin, epibromohydrin, allyl glycidyl, N-methyl morpholine and N-ethyl morpholine and is within the scope of this invention, is evaluated using a 1,950 pound per hour steel and galvanized iron work load, and accumulates 18.6 percent oil in the boiling sump during the test period. While solvent decrease is relatively high at 34.7 percent, the decrease in combined epoxides is only 33.8 percent and decrease in combined N-methyl morpholine and N-ethyl morpholine is only 18.2 percent.

The results in Table VII show that under conditions of high work load and high oil content in the boiling sump, both of which cause higher solvent evaporative losses, the per cent decreases of total combined epoxides and N-ethyl morpholine are less than exhibited with only epichlorohydrin and N-methyl morpholine, as indicated by acid acceptance and alkalinity.

It is to be understood that although this invention has been described with specific reference to particular embodiments thereof, it is not to be so limited, since changes and alterations therein may be made which are within the full intended scope of this invention as defined by the appended claims.

TABLE I

Evaporation Tests with Perchloroethylene Samples containing 75 ppm N-methyl morpholine, 5 ppm of p-tertiary amylphenol and the indicated quantity of epoxide.

| Sample | Epoxide[a] | Epoxide ppm Initial | % Sample Evaporated | Acid Acceptance as % NaOH |
| --- | --- | --- | --- | --- |
| 1 | EPH | 3500 | 0 | 0.152 |
|  |  |  | 25 | 0.024 |
| 2 | EBH | 5200 | 0 | 0.152 |
|  |  |  | 25 | 0.114 |
| 3 | EBH | 2600 | 0 | 0.152 |
|  | AGE | 2160 | 25 | 0.095 |
| 4 | EPH | 1750 | 0 | 0.152 |
|  | AGE | 2160 | 25 | 0.079 |

[a] EPH is epichlorohydrin
EBH is epibromohydrin
AGE is allyl glycidyl ether

TABLE II

Evaporation and Stability Tests with Perchloroethylene Samples containing 75 ppm of N-methyl morpholine, 5 ppm of p-tertiary amylphenol and the indicated quantity of epoxide.

| Sample | Epoxide[a] | Epoxide ppm Initial | Mole % Epoxide Initial | Mole % Epoxide Final | Acid Acceptance as % NaOH Initial | Acid Acceptance as % NaOH Final | % Sample Evaporated | 48 HOUR STABILITY TEST On Steel mg. loss | 48 HOUR STABILITY TEST On Steel Acid as % HCl |
|---|---|---|---|---|---|---|---|---|---|
| 5 | EPH | 3500 | 0.623 | 0.048 | 0.152 | 0.012 | 26.5 | 26.5 | 0.234 |
| 6 | EPH | 1170 | 0.208 | 0.033 | | | | | |
|   | EBH | 1740 | 0.208 | 0.129 | | | | | |
|   | AGE | 1450 | 0.208 | 0.290 | | | | | |
|   | Total | | 0.624 | 0.452 | 0.152 | 0.110 | 28.4 | 4.9 | 0.010 |

[a]EPH is epichlorohydrin
EBH is epibromohydrin
AGE is allyl glycidyl ether

TABLE III

Evaporation and Stability Tests with Perchloroethylene Sample containing 25 ppm of N-methyl morpholine, 50 ppm of p-tertiary amylphenol, 1500 ppm of epichlorohydrin, 900 ppm of epibromohydrin, 470 ppm of allyl glycidyl ether, 150 ppm N-methyl pyrrole and 100 ppm of N-ethyl morpholine.

| Sample | Epoxide[a] | Epoxide ppm Initial | Mole % Epoxide Initial | Mole % Epoxide Final | Acid Acceptance as % NaOH Initial | Acid Acceptance as % NaOH Final | % Sample Evaporated | 72 HOUR STABILITY TEST On Steel mg. loss | 72 HOUR STABILITY TEST On Steel Alk[b] as % NaOH |
|---|---|---|---|---|---|---|---|---|---|
| 7 | EPH | 1500 | 0.267 | 0.043 | | | | | |
|   | EBH | 900 | 0.107 | 0.054 | | | | | |
|   | AGE | 470 | 0.068 | 0.088 | | | | | |
|   | Total | 2870 | 0.442 | 0.185 | 0.108 | 0.045 | 25.9 | 63 | 0.0024 |

[a]EPH is epichlorohydrin
EBH is epibromohydrin
AGE is allyl glycidyl ether
[b]Alk is alkalinity

TABLE IV

TESTS WITH PERCHLOROETHYLENE SAMPLES CONTAINING INDICATED QUANTITY OF EPOXIDE IN MINIDEGREASER AND COMMERCIAL DEGREASER AT NO WORK LOAD (IDLING)

| Sample | Degreaser[a] | Epoxide[b] | Mole % Epoxide Initial | Mole % Epoxide Final | % Sample Evaporated | % Decrease in Epoxide | % Acid Acceptance Initial | % Acid Acceptance Final | % Decrease in Acid Acceptance |
|---|---|---|---|---|---|---|---|---|---|
| 8 | M | EPH | 0.623 | 0.285 | 13.5 | 54.2 | 0.152 | 0.0695 | 54.2 |
| 9 | C | EPH | 0.139 | 0.0653 | 13.5 | 53.1 | 0.0339 | 0.0159 | 53.1 |
| 10 | M | EPH | 0.623 | 0.192 | 17.7 | 69.2 | 0.152 | 0.0468 | 69.2 |
| 11 | C | EPH | 0.288 | 0.0661 | 17.7 | 77.0 | 0.0702 | 0.0161 | 77.0 |

[a]M is minidegreaser
C is commercial degreaser
[b]EPH is epichlorohydrin

TABLE V

TESTS WITH PERCHLOROETHYLENE SAMPLES CONTAINING INDICATED QUANTITY OF EPOXIDE IN MINIDEGREASER AND COMMERCIAL DEGREASER AT NO WORK LOAD (IDLING)

| Sample | Degreaser[a] | Epoxide[b] | Mole % Epoxide Initial | Mole % Epoxide Final | % Sample Evaporated | % Decrease in Epoxide | % Acid Acceptance Initial | % Acid Acceptance Final | % Decrease in Acid Acceptance |
|---|---|---|---|---|---|---|---|---|---|
| 12 | M | EBH | 0.623 | 0.587 | 4.2 | 5.7 | 0.152 | 0.1432 | 5.7 |
| 13 | C | EPH | 0.415 | 0.328 | | 21.0 | | | |
|    |   | EBH | 0.0959 | 0.0915 | | .4 | .6 | | |
|    |   | Total | 0.5109 | 0.4195 | 4.2 | 17.8 | 0.1248 | 0.1024 | 17.8 |
| 14 | C | EPH | 0.208 | 0.144 | | 30.8 | | | |
|    |   | EBH | 0.208 | 0.192 | | 7 | .7 | | |
|    |   | Total | 0.416 | 0.336 | 4.2 | 19.2 | 0.1014 | 0.0820 | 19.2 |

[a]M is minidegreaser
C is commerical degreaser
[b]EPH is epichlorohydrin
EBH is epibromohydrin

TABLE VI

TESTS WITH PERCHLOROETHYLENE SAMPLES CONTAINING INDICATED QUANTITY OF EPOXIDE IN COMMERCIAL DEGREASER WITH WORK LOAD

| Sample | Hours of Test | Volume % Oil in Boiling Sump Final | lb. per hr. work load | Epoxide[a] | Mole % Epoxide Initial | Mole % Epoxide Final | % Sample Evaporated | % Decrease in Epoxide |
|---|---|---|---|---|---|---|---|---|
| 15[b] | 41 | 23.2 | 515 | EPH | 0.595 | 0.212 | 27.6 | 64.4 |
| 16[c] | 46 | 34.5 | 990 | EPH | 0.308 | 0.177 | | |
| | | | | EBH | 0.0933 | 0.0486 | | |
| | | | | AGE | 0.0633 | 0.0990 | | |
| | | | | Total | 0.4646 | 0.3246 | 42.3 | 30.0 |
| 17[c] | 41 | 21.4 | 990 | EPH | 0.326 | 0.199 | | |
| | | | | EBH | 0.0911 | 0.0734 | | |
| | | | | AGE | 0.0659 | 0.0584 | | |
| | | | | Total | 0.4830 | 0.3308 | 35.4 | 31.5 |

| Sample | % Acid Acceptance Initial | % Acid Acceptance Final | % Decrease in Acid Acceptance | ppm Alk[d] Initial | ppm Alk[d] Final | % Decrease |
|---|---|---|---|---|---|---|
| 15[b] | 0.145 | 0.0517 | 64.4 | 4.2 | 0 | 100 |
| 16[c] | 0.113 | 0.0793 | 30.0 | 11.8 | 6.0 | 49.1 |
| 17[c] | 0.118 | 0.0808 | 31.5 | 16.8 | 15.7 | 6.5 |

[a]EPH is epichlorohydrin
EBH is epibromohydrin
AGE is allyl glycidyl ether
[b]Also contains N-Methyl Morpholine
[c]Also contains N-Methyl Morpholine and N-ethyl morpholine
[d]Alk is alkalinity

TABLE VII

TESTS WITH PERCHLOROETHYLENE SAMPLES CONTAINING INDICATED QUANTITY OF EPOXIDE IN COMMERCIAL DEGREASER AT NO WORK LOAD (IDLING) AND WITH WORK LOAD

| Sample | Volume % Oil in Boiling Sump Initial | Volume % Oil in Boiling Sump Final | lb. per hour Work Load | Epoxide[a] | Mole % Epoxide Initial | Mole % Epoxide Final | % Sample Evaporated | % Decrease in Epoxide |
|---|---|---|---|---|---|---|---|---|
| 18[b] | 0 | 0 | 0 | EPH | 0.411 | 0.131 | 12.1 | 68.1 |
| 19[c] | 0 | 18.6 | 1,950 | EPH | 0.165 | 0.0709 | | 57.1 |
| | | | | EBH | 0.117 | 0.0956 | | 18.3 |
| | | | | AGE | 0.0674 | 0.0646 | | 4.1 |
| | | | | Total | 0.3494 | 0.2311 | 34.7 | 33.8 |

| Sample | % Acid Acceptance Initial | % Acid Acceptance Final | % Decrease in Acid Acceptance | ppm Alk[d] Initial | ppm Alk[d] Final | % Decrease |
|---|---|---|---|---|---|---|
| 18[b] | 0.100 | 0.0319 | 68.1 | 6.2 | 3.4 | 45.2 |
| 19[c] | 0.0852 | 0.0564 | 33.8 | 19.2 | 15.7 | 18.2 |

[a]EPH is epichlorohydrin
EBH is epibromohydrin
AGE is allyl glycidyl ether
[b]Also contains N-methyl morpholine
[c]Also contains N-methyl morpholine and N-ethyl morpholine
[d]Alk is alkalinity

What is claimed:

1. A process for vapor degreasing metal which comprises contacting a metal with vapors from a stabilized perchloroethylene composition consisting essentially of perchloroethylene containing a stabilizing amount of a chemical component selected from the group consisting of (1) epibromohydrin and (2) epibromohydrin and allyl glycidyl ether.

2. The process of claim 1 wherein from about 0.001 to about 2 percent by weight of the component is present in the composition.

3. The process of claim 1 wherein the metal contains a member selected from the group consisting of iron, aluminum, copper and zinc.

4. The process of claim 1 wherein the component in the composition is (1) epibromohydrin.

5. The process of claim 1 wherein the component in the composition is (2) epibromohydrin and allyl glycidyl ether.

6. A process for vapor degreasing metal which comprises contacting a metal with vapors from a stabilized perchloroethylene composition consisting essentially of perchloroethylene containing N-ethyl morpholine and a chemical component selected from a group consisting of (1) epibromohydrin and (2) epibromohydrin and allyl glycidyl ether.

* * * * *